(12) United States Patent
Leimer

(10) Patent No.: US 11,589,696 B2
(45) Date of Patent: Feb. 28, 2023

(54) MAGNETIC COOLIE BEVERAGE HOLDER

(71) Applicant: Best Promotions, LLC, Balch Springs, TX (US)

(72) Inventor: Stefan Leimer, Balch Springs, TX (US)

(73) Assignee: Best Promotions, LLC, Balch Springs, TX (US)

( * ) Notice: Subject to any disclaimer, the term of this patent is extended or adjusted under 35 U.S.C. 154(b) by 338 days.

(21) Appl. No.: 16/990,671

(22) Filed: Aug. 11, 2020

(65) Prior Publication Data

US 2022/0047103 A1 Feb. 17, 2022

(51) Int. Cl.
| | |
|---|---|
| *A47G 23/02* | (2006.01) |
| *F16B 1/00* | (2006.01) |
| *G09F 23/00* | (2006.01) |
| *B65D 23/08* | (2006.01) |
| *B65D 81/38* | (2006.01) |
| *B65D 25/34* | (2006.01) |

(52) U.S. Cl.
CPC ......... *A47G 23/02* (2013.01); *B65D 23/0842* (2013.01); *B65D 25/34* (2013.01); *B65D 81/3876* (2013.01); *F16B 1/00* (2013.01); *G09F 23/00* (2013.01); *A47G 2023/0291* (2013.01); *F16B 2001/0028* (2013.01); *F16B 2001/0035* (2013.01)

(58) Field of Classification Search
CPC ............ A47G 23/02; A47G 2023/0291; B65D 23/0842; B65D 25/34; B65D 81/3876; B65D 2313/04; F16B 1/00; F16B 2001/0028; F16B 2001/0035; G09F 23/00

USPC ............... 220/230, 739, 737, 903; 248/206.5
See application file for complete search history.

(56) References Cited

U.S. PATENT DOCUMENTS

| | | | |
|---|---|---|---|
| 4,540,611 A | 9/1985 | Henderson | |
| 5,320,249 A | 6/1994 | Strech | |
| 6,059,140 A * | 5/2000 | Hicks | B65D 81/3879 220/6 |
| 6,286,798 B1 | 9/2001 | Chun | |
| 7,021,594 B2 | 4/2006 | Exler | |
| D533,751 S | 12/2006 | Exler | |
| D547,618 S | 7/2007 | Exler | |
| 7,897,088 B2 | 3/2011 | Mitchell | |
| 8,001,671 B2 | 8/2011 | Mitchell | |
| 9,578,954 B2 | 2/2017 | Sellars | |
| D851,463 S | 6/2019 | Adjeleian | |
| 2010/0019110 A1 * | 1/2010 | Shepley | A01K 63/006 248/206.5 |

* cited by examiner

*Primary Examiner* — John K Fristoe, Jr.
*Assistant Examiner* — Elizabeth J Volz
(74) *Attorney, Agent, or Firm* — Thorpe North & Western, LLP

(57) ABSTRACT

A beverage holder with an insulating sleeve holds a beverage container and a magnetic mount to magnetically secure the insulating sleeve with the beverage container therein to a ferromagnetic support structure. The magnetic mount comprises an exterior housing located outside the insulating sleeve and on a lateral wall of the insulating sleeve. A magnet is carried by the exterior housing and located outside of the insulating sleeve. An interior backing is located on an interior of the insulating sleeve and fastened to the exterior housing through the insulating sleeve. The exterior housing and the interior backing sandwich a portion of the lateral wall of the insulating sleeve.

20 Claims, 5 Drawing Sheets

MAGNETIC COOLIE BEVERAGE HOLDER

BACKGROUND

Beverages are often consumed from beverage containers, such as bottles and cans, in environments with elevated temperatures. It is often desirable to keep such beverages cool when ambient temperatures are high. In addition, it can be desirable to insulate a holder's hand from the cold beverage container, and to improve a grip between the holder's hand and a wet surface of the beverage container with condensation. Insulated sleeves have been proposed that can surround the beverage container. It has also been proposed to use a magnet to hold the insulated sleeve with respect to a surface, such as a vehicle. Examples of such insulated sleeves are shown in U.S. Pat. Nos. 4,540,611; 5,320,249; 6,059,140; 6,286,798; 7,021,594; 7,897,088; 8,001,671; 9,578,954; D851,463; D547,618; D533,751. Such an insulated sleeve is also known as a Koozie®, a coozy, a coolie, a stubby holder, a drink caddy, a can cooler, a can cover and a can hugger. The insulated sleeve can also be utilized to distinguish beverage containers amongst a group of holders and beverage containers, and for marketing purposes.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Figure 1:
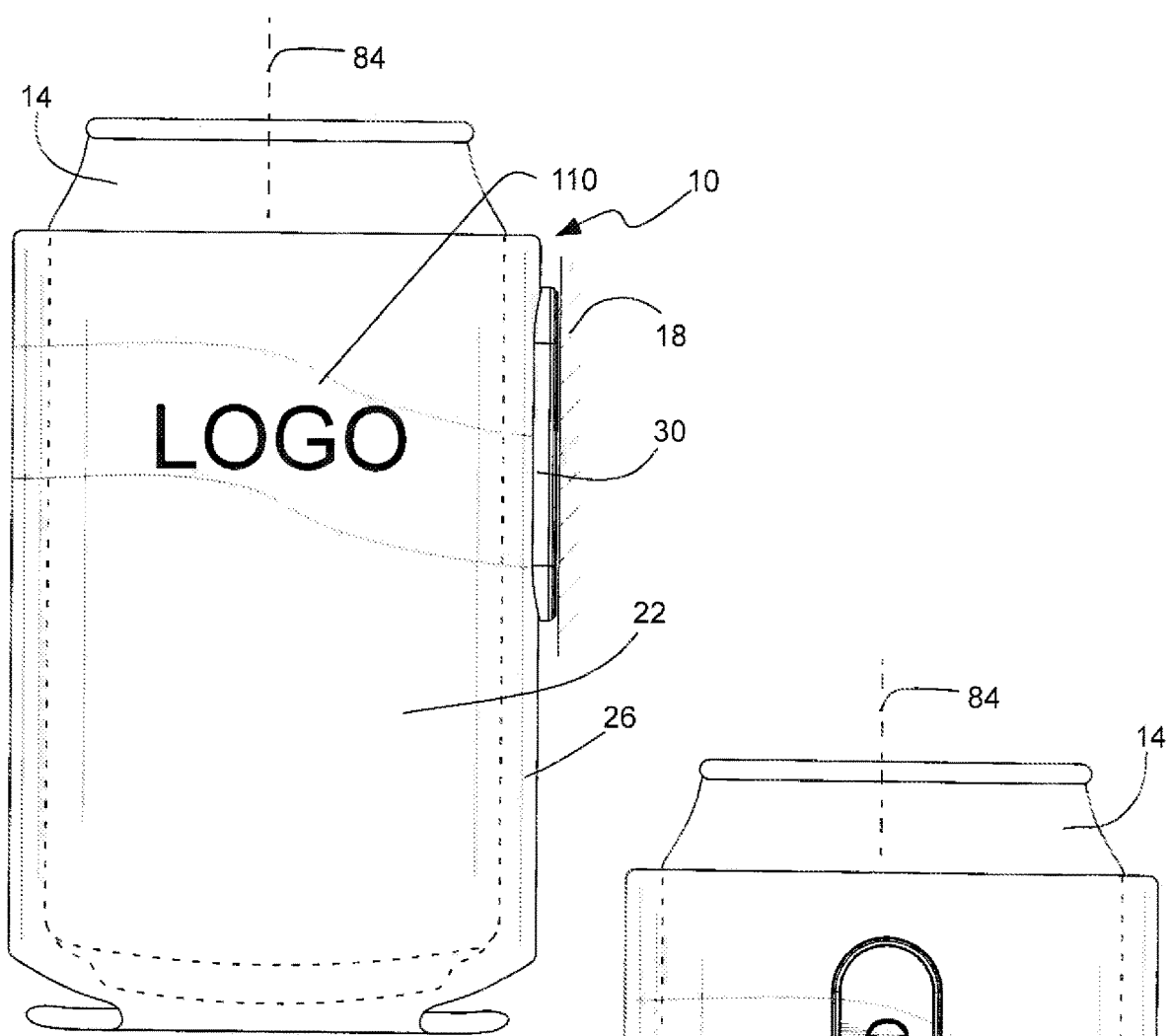
FIG. 1 is a side view of the beverage holder in accordance with an embodiment of the invention, shown holding a beverage container and magnetically secured to a ferromagnetic support structure.
Figure 2:
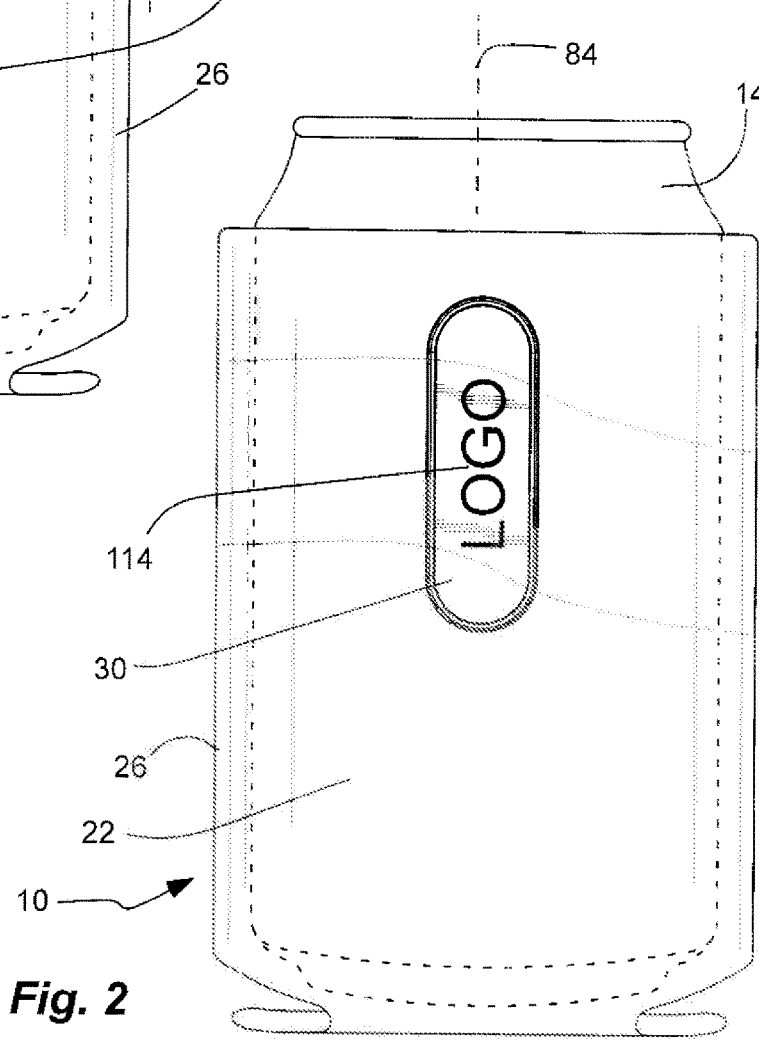
FIG. 2 is a front view of the beverage holder of FIG. 1.
Figure 3:
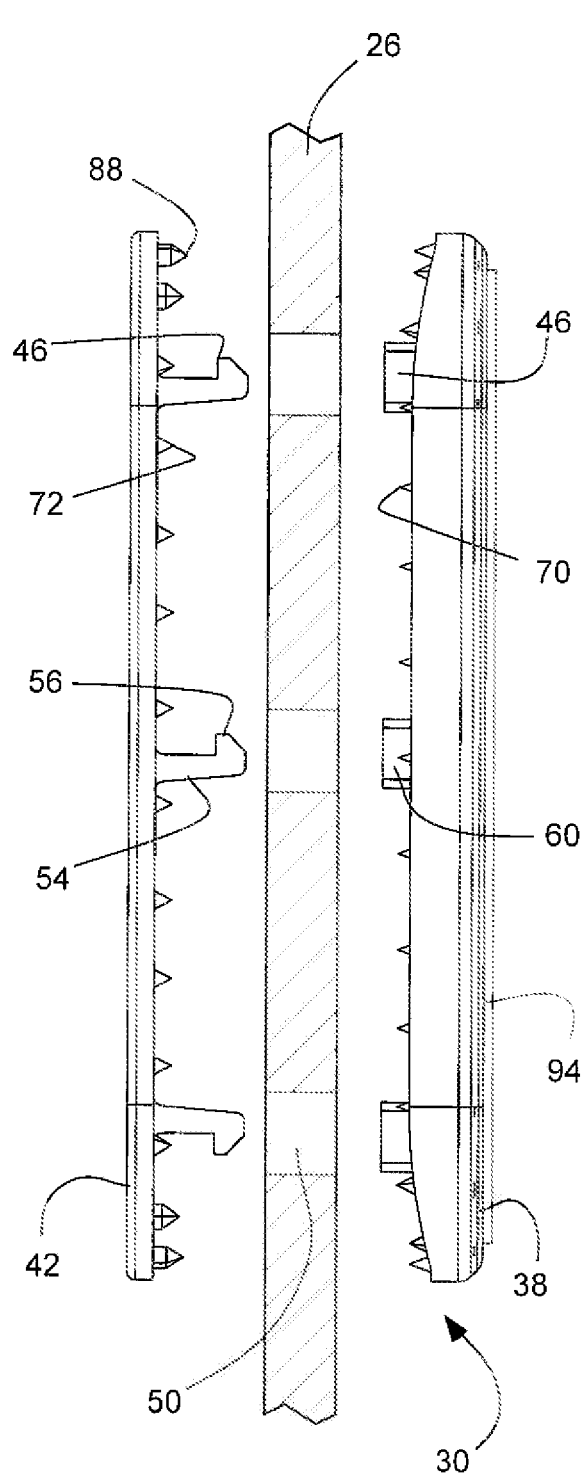
FIG. 3 is an exploded partial side view of the beverage holder of FIG. 1, and namely a magnetic mount attachable to an insulating sleeve.
Figure 4:
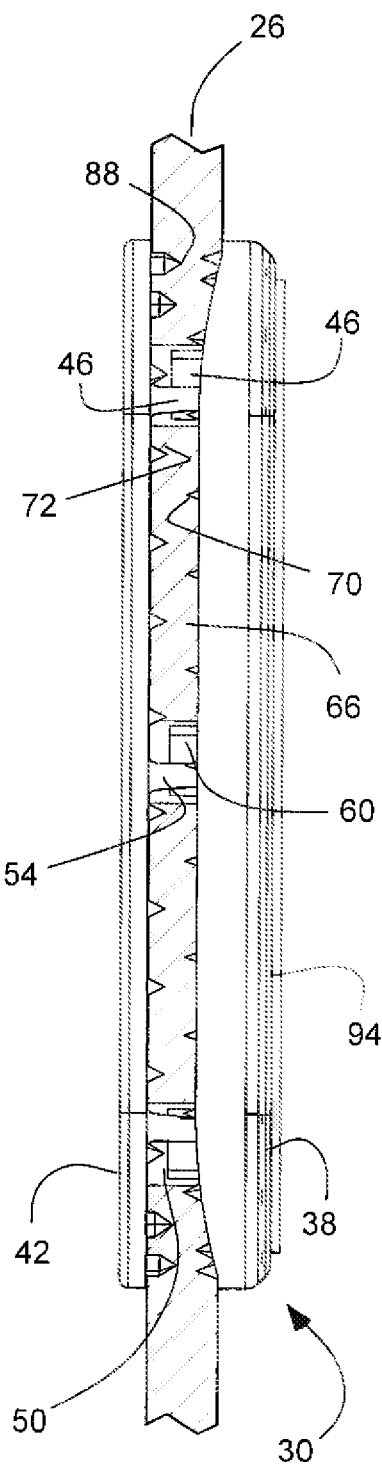
FIG. 4 is a partial side view of the beverage holder of FIG. 1, and namely the magnetic mount attached to the insulating sleeve.
Figure 5:
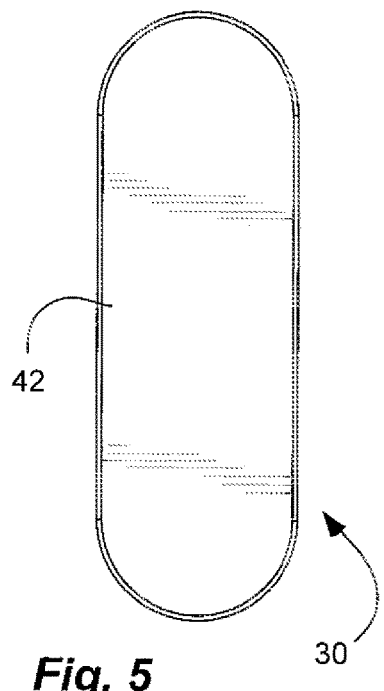
FIG. 5 is a back view of the magnetic mount of the beverage holder of FIG. 1 as viewed from within the insulating sleeve.
Figure 6:
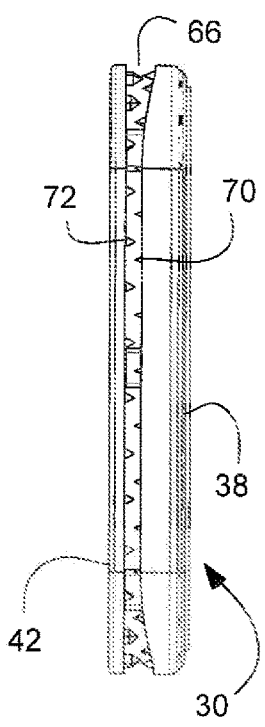
FIG. 6 is a side view of the magnetic mount of the beverage holder of FIG. 1 without the insulating sleeve.
Figure 7:
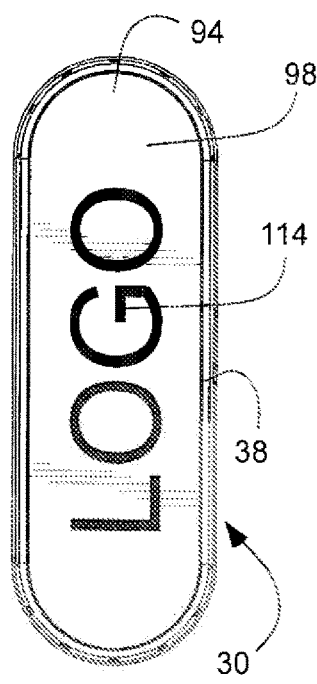
FIG. 7 is a front view of the magnetic mount of the beverage holder of FIG. 1.
Figure 8:
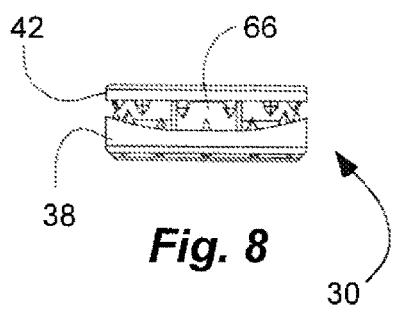
FIG. 8 is a bottom view of the magnetic mount of the beverage holder of FIG. 1 without the insulting sleeve.
Figure 9:
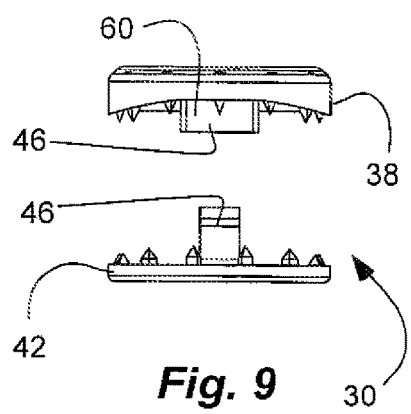
FIG. 9 is an exploded top view of the magnetic mount of the beverage holder of FIG. 1 without the insulating sleeve.
Figure 10:
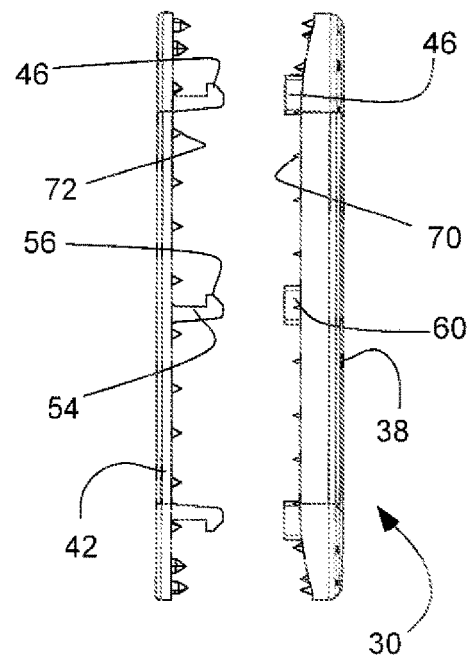
FIG. 10 is an exploded side view of the magnetic mount of the beverage holder of FIG. 1 without the insulating sleeve.

Reference will now be made to the exemplary embodiments illustrated, and specific language will be used herein to describe the same. It will nevertheless be understood that no limitation of the scope of the invention is thereby intended.

DETAILED DESCRIPTION

Before invention embodiments are disclosed and described, it is to be understood that no limitation to the particular structures, process steps, or materials disclosed herein is intended, but also includes equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence. Unless defined otherwise, all technical and scientific terms used herein have the same meaning as commonly understood by one of ordinary skill in the art to which this disclosure belongs.

As used in this specification and the appended claims, the singular forms "a," "an" and "the" include plural referents unless the context clearly dictates otherwise. Thus, for example, reference to "a layer" includes a plurality of such layers.

In this disclosure, "comprises," "comprising," "containing" and "having" and the like can have the meaning ascribed to them in U.S. Patent law and can mean "includes," "including," and the like, and are generally interpreted to be open ended terms. The terms "consisting of" or "consists of" are closed terms, and include only the components, structures, steps, or the like specifically listed in conjunction with such terms, as well as that which is in accordance with U.S. Patent law. "Consisting essentially of" or "consists essentially of" have the meaning generally ascribed to them by U.S. Patent law. In particular, such terms are generally closed terms, with the exception of allowing inclusion of additional items, materials, components, steps, or elements, that do not materially affect the basic and novel characteristics or function of the item(s) used in connection therewith. For example, trace elements present in a composition, but not affecting the composition's nature or characteristics would be permissible if present under the "consisting essentially of" language, even though not expressly recited in a list of items following such terminology. When using an open ended term in the specification, like "comprising" or "including," it is understood that direct support should be afforded also to "consisting essentially of" language as well as "consisting of" language as if stated explicitly and vice versa.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments described herein are, for example, capable of operation in other orientations than those illustrated or otherwise described herein.

The term "coupled," as used herein, is defined as directly or indirectly connected in an electrical or nonelectrical manner. Objects described herein as being "adjacent to" each other may be in physical contact with each other, in close proximity to each other, or in the same general region or area as each other, as appropriate for the context in which the phrase is used. Occurrences of the phrase "in one embodiment," or "in one aspect," herein do not necessarily all refer to the same embodiment or aspect.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, "adjacent" refers to the proximity of two structures or elements. Particularly, elements that are identified as being "adjacent" may be either abutting or connected. Such elements may also be near or close to each other without necessarily contacting each other. The exact degree of proximity may in some cases depend on the specific context.

As used herein, the term "about" is used to provide flexibility to a numerical range endpoint by providing that a given value may be "a little above" or "a little below" the endpoint. It is understood that express support is intended for exact numerical values in this specification, even when the term "about" is used in connection therewith.

The terms "interference fit" and "friction fit" and "press-fit" are terms of art used interchangeably herein to refer to deliberately causing, increasing and/or using friction to deliberately resist movement. An interference fit or friction fit is different than and great than the existence of friction. While friction may exist between any two surfaces, is often desirable to do all one can to reduce this friction. An interference fit or friction fit can be distinguished from naturally occurring friction by being actually deliberately caused and increased. An interference fit can be created by dimensioning engaging parts so that their surfaces tightly bear against one another. A friction fit can be created by surface roughness that is rougher.

The term "ferromagnetic" is used herein to refer to a material or element that has magnetic properties and/or an ability to magnetically couple, either by being magnetic, or being magnetically attracted to a magnet (such as by containing iron) such that one ferromagnetic material or element is magnetically attracted to another ferromagnetic material or element. Thus, a ferromagnetic element is a magnet or is magnetic, such as a permanent magnet, or is attracted to magnets, such as by containing iron.

The terms "indicium" and "indicia" are used interchangeably herein, unless otherwise noted.

The terms "business", "company" are used broadly and interchangeably herein to refer to an organization that provides a product or a service. The business, company or organization can have a name, logo, slogan, trademark, service mark, etc. that is capable of identifying and/or distinguishing the business or company, or product or service, or both, or can otherwise be utilized to market, promote, and/or brand the business or company, or product or service, or both. The indicium can be indicative of such a business, and can comprise a name, logo, slogan, trademark, service mark, etc.

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

The beverage holder can provide a magnetic mount with a pair of shells, such as an exterior shell or housing, and an interior shell or backing, sandwiching a lateral wall of the beverage holder therebetween and securing a magnet to the beverage holder. The beverage holder can receive a beverage container and secure and suspend the beverage holder and the beverage container from a ferromagnetic support structure. In one aspect, the pair of shells can have an array of teeth penetrating the lateral wall of the beverage holder to maintain the orientation of the magnetic mount with respect to the beverage holder with the beverage container therein. In another aspect, a grip pad can be carried on the exterior shell or housing, and can provide an exterior surface to contact the support structure. The exterior surface of the grip pad can be flexible to help provide a non-slip grip between the magnetic mount and the ferromagnetic support structure.

Referring to FIGS. 1-18, a beverage holder 10 is shown in accordance with an embodiment of the invention. The beverage holder 10 can receive and hold a beverage container 14 therein while allowing the beverage holder 10 and the beverage container 14 to be suspended magnetically from a ferromagnetic support structure 18. The ferromagnetic support structure 18 can be a metal surface that is vertical or inclined, such as a vehicle body panel, a vehicle accessory or structure, a chair, etc. Thus, the beverage container 14 can be located and held in a convenient location. The beverage container 14 can be an aluminum can, a bottle, a thermos, an insulated or vacuum bottle, a plastic or Styrofoam cup, a glass, etc. Such beverage containers 14 can have a cylindrical perimeter.

The beverage holder 10 can comprise an insulating sleeve 22 to receive, hold and insulate the beverage container 22.

In one aspect, the insulating sleeve 22 can be flexible and foldable. Thus, the insulating sleeve 22 can have a cylindrical configuration and a flat configuration. For example, the insulating sleeve 22 can comprise neoprene, and can have a thicker foam layer covered by a thinner outer fabric layer. In one aspect, the insulating sleeve 22 can be cylindrical with a lateral wall 26 that can be cylindrical, and that can circumscribe the beverage container 14. In one aspect, the insulating sleeve 22 and the lateral wall 26 can be open at the top and the bottom, and can grip the beverage container 14 with a friction fit. In another aspect, the insulating sleeve 22 and the lateral wall 26 can have closed bottom with a bottom. The insulating sleeve 22 can be formed by cutting or stamping a pattern and sewing the pattern to form the sleeve. The insulating sleeve 22 can be formed of a single piece sewn into shape. In another aspect, the insulating sleeve can be rigid, and can comprise a closed-cell foam. In another aspect, the insulating sleeve 22 can have additional portions tailored to a particular beverage container, such as an inverted frusto-conical top adapted for a long neck bottle. In another aspect, the insulating sleeve 22 can have other novelty shapes. In another aspect, the insulating sleeve 22 and the lateral wall 26 can have fasteners, such as buttons, shoe-lace or a zipper, to close the insulating sleeve 22 and the lateral wall 26 about the beverage container 14 and to cinch and grip the beverage container 14. In one aspect, the insulating sleeve 22 has at least a cylindrical portion to circumscribe at least a portion of a cylindrical portion of the beverage container. The insulating sleeve 22 can be flexible and resilient, such as elastic, to stretch and expand to receive the beverage container 14 and retract about the perimeter of the beverage container.

In addition, the beverage holder 10 can comprise a magnetic mount 30 to magnetically secure the insulating sleeve 22 with the beverage container 14 therein to the ferromagnetic support structure 18, and suspend the insulating sleeve 22 with the beverage container 14 therein pendant from the support structure 18. In one aspect, the magnetic mount 30 can carry and position at least one magnet 34 on an exterior of the insulating sleeve 22. In another aspect, the magnetic mount 30 can be rigid to maintain an orientation of the magnet(s) 34 and the contact surface. In one aspect, the magnetic mount 30 can comprise a housing such as a pod, case, encasement, casing, capsule, sheath, cover, etc. The magnetic mount 30 can comprise a pair of shells, such as a pair of housing portions, including an exterior shell and housing 38, and an interior shell and backing 42. The pair of shells, and the exterior housing 38 and the interior backing 42, can carry the magnet(s) 34, position the magnet(s) 34 on an exterior of the insulating sleeve 26, and sandwich a portion of the insulating sleeve 26 between the pair of shells; thus mounting the magnet(s) 34 to the insulating sleeve 26.

The exterior shell and housing 38 is located outside the insulating sleeve 22 and on the lateral wall 26 of the insulating sleeve 22. The magnet(s) 34 can be carried by the exterior shell and housing 38 and located outside of the insulating sleeve 22 and lateral wall 26 thereof. The interior shell and backing 42 can be located on an interior of the insulating sleeve 22 and the lateral wall 26 thereof. The pair of shells, and the exterior shell and housing 38 and the interior shell and backing 42, sandwich a portion of the lateral wall 26 of the insulating sleeve 22 therebetween.

The pair of shells, and the exterior shell and housing 38 and the interior shell and backing 42, are fastened and joined through the insulating sleeve 22 and the lateral wall 26. At least one fastener 46 can be carried by the pair of shells 38 and 42 and can extend through at least one aperture 50 in the lateral wall 26 of the insulating sleeve 22 to couple the pair of shells 38 and 42 together. In one aspect, the fastener 46 can comprise an array of fasteners, and the aperture 50 can comprise an array of holes. The fastener 46 can include a portion carried by the interior shell and backing 42 engaging another portion carried by the exterior shell and housing 38. One of the portions can comprise a finger 54 with a hook 56, and another of the portions can comprise a cavity 60 with a tab 62 (FIG. 12) engaged by the hook 56 of the finger 54. Thus, the pair of shells 38 and 42 can be pressed together, with the finger 54 deflecting as the hook 56 engages the tab 62, and then returning as the hook 56 passes the tab 62, so that the tab 62 retains the hook 56. The fastener 46 can be a snap-fit. In one aspect, the beverage holder 10 can be provided with the magnetic mount 30. In another aspect, the magnetic mount 30 can be provided separately to retrofit an existing beverage holder 10 or insulating sleeve 22 without a magnetic mount.

The pair of shells 38 and 42, and the interior sides thereof, can have a gap 66 (FIG. 4) therebetween. In one aspect, the gap 66 between the pair of shells 38 and 42 can be smaller than a thickness of the lateral wall 26 of the insulating sleeve 22. The insulating sleeve 22 and the lateral wall 26 can comprise a material that is elastic, and that is flexible and resilient. Thus, the pair of shells 38 and 42 can compress the lateral wall 26, and the lateral wall 26 can bias the pair of shells 38 and 42 outwardly to help maintain the engagement of the fastener(s) 46, and the engagement of the hook 56 and the tab 60.

In another aspect, the pair of shells 38 and 42 can have at least one array of teeth 70 and 72 carried by at least one of the exterior shell and housing 38 and the interior shell and backing 42. In one aspect, the outer shell and housing 38 can have the array of teeth 70. In another aspect, the inner shell and backing 42 can have the array of teeth 72. In another aspect, both shells 38 and 42 can have the array of teeth 70 and 72, respectively. The array of teeth 70 and 72 can penetrate into the insulating sleeve 22 and the lateral wall 26 to help maintain the relative position of the shell 38 or 42 with respect to the lateral wall 26, even under the weight of the beverage and the beverage container. The array of teeth 70 and 72 can circumscribe and be arrayed around a perimeter of the shell 38 and 42, respectively. The teeth of the array of teeth 70 and 72 can be pointed, and can extend from an interior side of the respective shell 38 and 42.

As discussed above, both of the exterior shell and housing 38 and the interior shell and backing 42 can carry arrays of teeth 70 and 72, respectively, penetrating into the insulating sleeve 26. In one aspect, the array of teeth 72 of the interior shell and backing 42 and the array of teeth 70 of the exterior shell and housing 38 can be off-set with respect to one another, and the teeth of the arrays 70 and 72 can be intermeshed and off-set. For example, a tooth of the interior shell and backing 42 can extend between a pair of adjacent teeth of the exterior shell and housing 38. Thus, the teeth of the arrays 70 and 72 can alternate with respect to one another around the perimeter of the magnetic mount 30 for improved grip. This allows the teeth to be longer without interfering with one another.

Figure 11:
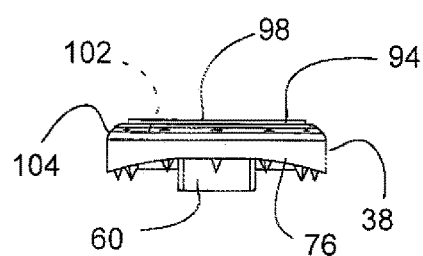
FIG. 11 is a top view of a housing and an exterior shell of the magnetic mount of the beverage holder of FIG. 1.
Figure 12:
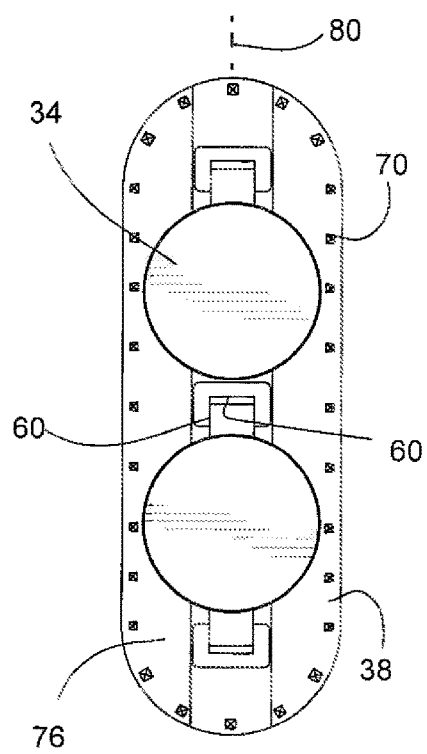
FIG. 12 is a rear view of the housing and the exterior shell of the magnetic mount of the beverage holder of FIG. 1, showing magnets therein.
Figure 13:
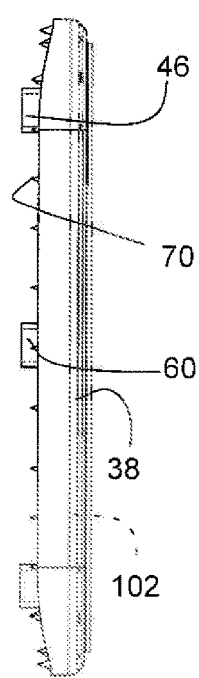
FIG. 13 is a side view of the housing and the exterior shell of the magnetic mount of the beverage holder of FIG. 1.
Figure 14:
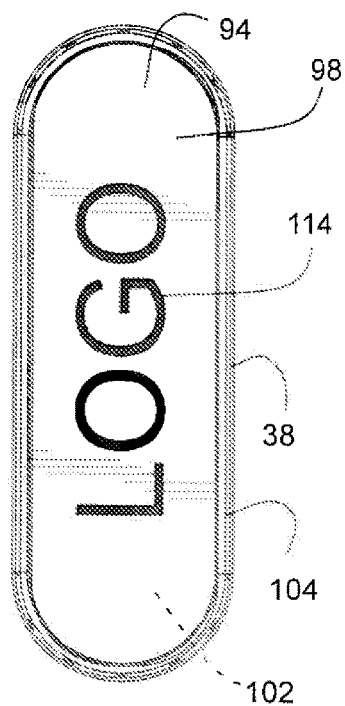
FIG. 14 is a front view of the housing and the exterior shell of the magnetic mount of the beverage holder of FIG. 1.
Figure 15:
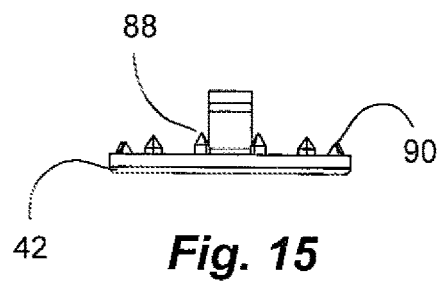
FIG. 15 is a top view of a backing and an interior shell of the magnetic mount of the beverage holder of FIG. 1.
Figure 16:
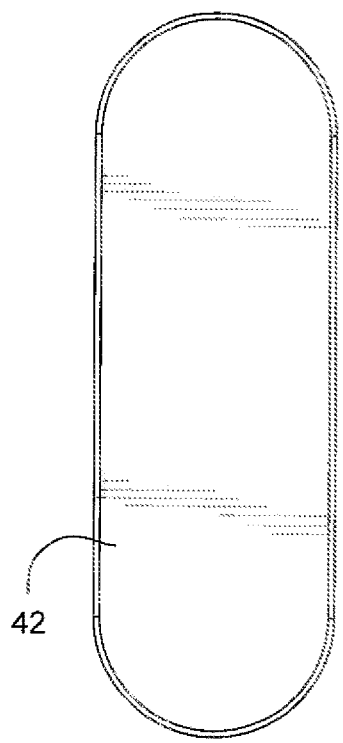
FIG. 16 is back view of the backing and the interior shell of the magnetic mount of the beverage holder of FIG. 1.
Figure 17:
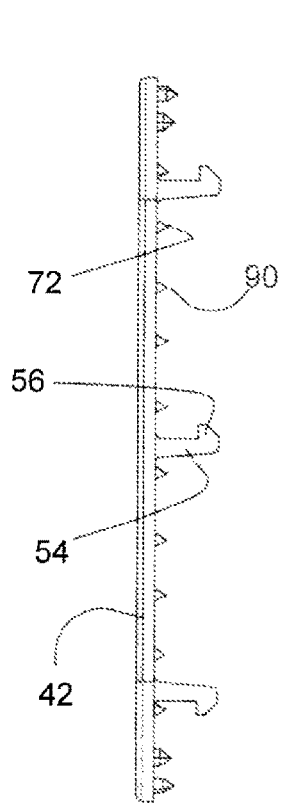
FIG. 17 is side view of the backing and the interior shell of the magnetic mount of the beverage holder of FIG. 1.
Figure 18:
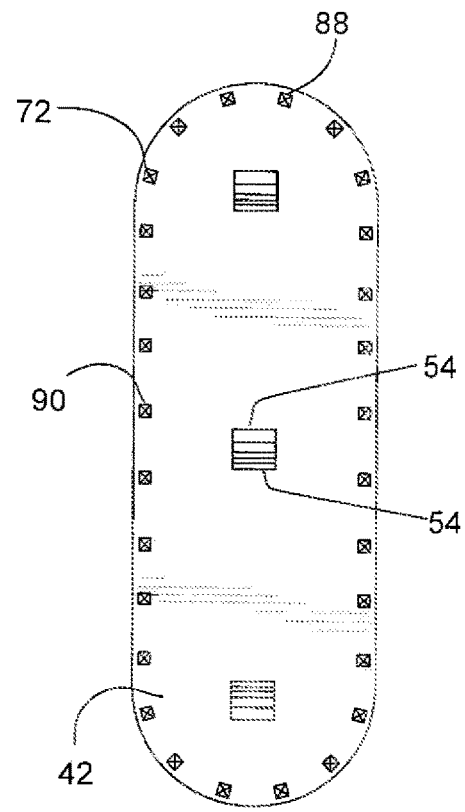
FIG. 18 is front view of the backing and the interior shell of the magnetic mount of the beverage holder of FIG. 1.

The exterior shell and housing 38 can have an interior side 76 with a concave shape, as shown in FIG. 11. The concave shape can be elongated along a longitudinal axis 80 parallel with a longitudinal axis 84 of the insulating sleeve 22 defined by the lateral wall 26 when in a cylindrical shape. Thus, the concave shape of the interior side 76 of the exterior shell and housing 38 can more closely conform to a curvature of the exterior of the lateral wall 26 of the insulating sleeve 22. The center teeth 88 of the array of teeth 72 nearer a center of the interior shell and backing 42 that are parallel with the longitudinal axis 84 can be taller than other teeth 90 of the array of teeth 72 further from the center. Thus, the height of the teeth of the array 72 of the interior shell and backing 42 can accommodate the concave shape of the exterior shell and housing 38.

In addition, the beverage holder 10 and the magnetic mount 30 can have a grip pad 94 carried on the exterior shell and housing 38 of the pair of shells. The grip pad 94 can defining an exterior surface 98 to contact the support structure 18. The exterior surface 98 and the grip pad 94 being flexible. Thus, the grip pad 94 can provide a non-slip surface to help maintain the location of the beverage holder 10 and the beverage container 14 on the support structure 18. In one aspect, the exterior shell and housing 38 can have an indentation 102 surrounded by a perimeter lip 104. The grip pad 94 can be disposed in the indentation 102 and can have a thickness such that the exterior surface 98 of the grip pad is located beyond the perimeter lip 104 and out of the indentation 102. The indentation 102 and perimeter lip 104 can help maintain the grip pad 94. In one aspect, the grip pad 94 can be adhered to the exterior shell and housing 38. The exterior surface 98 of the grip pad 94 can defining an outermost surface of the magnetic mount 30.

The grip pad 94 and the exterior surface 98 can be formed of, or can comprise, a tacky material and the exterior surface 98 can be tacky. Thus, the tackiness of the exterior surface 98 can cling to the support structure 14, along with the magnet(s) 34, to resist displacement and slipping of the beverage holder 10 and the beverage container 14 with respect to the support structure 14, such as during motion of a vehicle when the support structure 14 is associated with a vehicle. In one aspect, the grip pad 94 and the exterior surface 98 can be formed of or can comprise thermoplastic polyurethane (TPU), thermoplastic rubber (TPR), or thermoplastic elastomer (TPE). In another aspect, the grip pad 94 and the exterior surface 98 can be formed of or can comprise a polyurethane material. In another aspect, the grip pad 94 and the exterior surface 98 can be formed of or can comprise a silicone composite material. Thus, the grip pad 94 and the exterior surface 98 can be semi-rigid and tacky. The tacky quality of the grip pad 94 and the exterior surface 98 can cling to the support structure 14, such as by mechanical or specific adhesion. The tacky quality can be provided by a material of the grip pad 94 and the exterior surface 98. For example, the exterior surface 98 of the grip pad 94 and the exterior surface 98 can comprise a polyurethane to be both tacky and translucent or transparent. In one aspect, the exterior surface 98 can comprise apertures and/or protrusions therein to provide a textured surface to further resist displacement of the beverage holder 10 and the beverage container 14 with respect to the support structure 14.

In one aspect, the beverage holder 10 and the magnetic mount 30 can have indicia. The indicium can be indicative of or represent a business, a product, or both. Thus, the beverage holder 10 can be used as a promotional product. The indicia can include sleeve indicium 110 carried by an exterior of the insulating sleeve 22. In addition, the indicia can include grip pad indicium 114 carried by the magnetic mount 30, such as on the exterior surface 98 of the grip pad 94. In another aspect, the indicia can be matching indicia with the sleeve indicium 110 and the grip pad indicium 114 matching one another.

In one aspect, the grip pad 94 and the exterior surface 98 cart comprise a low-profile or squat dome. The dome can have a broad width, greater than a height or thickness thereof, and a perimeter edge with a fillet or radius edge. Thus, the dome can present a substantially flat exterior surfaced 98 to contact the support structure 14. In one aspect, the dome can be separate and distinct from the magnet mount 30 and the exterior shell and housing 38, but affixed thereto, such as with an adhesive.

In one aspect, the dome can be at least translucent. In another aspect, the dome can be substantially transparent. In addition, the indicium 114 can be disposed underneath the dome and visible therethrough. Thus, the indicium 114 can be protected by the dome. The indicium 114 can be printed on a layer that is affixed to a bottom of the dome separate from the magnetic mount 30 and the exterior shell and housing 38, and then the dome with the indicium 114 thereon can be affixed to the magnetic mount 30 and the exterior shell and housing 38. For example, the dome can comprise a graphic layer with the indicium 114 thereon disposed between the dome and the magnetic mount 30 and the exterior shell and housing 38. This can provide for greater visibility of the indicium 114, as opposed to printing directly on the magnetic mount 30 and the exterior shell and housing 38. The tacky quality of the dome can cling to the support structure 14, such as by mechanical or specific adhesion. The tacky quality can be provided by a material of the dome. For example, the exterior surface 98 of the dome can comprise a polyurethane to be both tacky and translucent or transparent. In another aspect, the indicium 114 can be disposed on the outermost surface of the dome. In another aspect, the dome can be contoured to increase frictional engagement with the support structure 14.

The dome can have a domed or semi-spherical exterior surface defining an outermost surface. In one aspect, the indicium 114 can be disposed on the domed or semi-spherical exterior surface. Thus, the indicium 114 can be curved or arcuate, and can be visible from the side.

As stated above, in one aspect, the dome can be a polyurethane dome. The dome can include the adhesive film adhered to an exterior side or surface of the grip pad 94 and the exterior surface 98. The adhesive film can use a chemical adhesive to adhere. The adhesive can be selected to provide sufficient adhesion between the dome and the grip pad 94 and the exterior surface 98 without separating as the beverage holder 10 is repeatedly used.

The tackiness of the outfacing surface can be obtained through various factors, which can include material, hardness/softness, and coefficient of friction. As described above, the dome can be formed of polyurethane. The polyurethane can be formed by combining a polyol with a catalyst or hardener. In one aspect, the ratio of polyol to catalyst can be between 1:0.63 to 0.85, so that there is more polyol than catalyst. In another aspect, the ratio of polyol to catalyst can be between 1:0.63 to 0.75. Typical polyurethane is obtained by mixing polyol and catalyst in a 1:1 ratio. In addition, in one aspect, the outfacing surface or the dome can have a hardness between 10 and 35 Shore D. In another aspect, the outfacing surface or the dome can have a hardness between 12 and 21 Shore D. In another aspect, the outfacing surface or the dome can have a hardness between 12 and 18 Shore D. Other non-tacky stickers or decals typically can have a hardness of 60 Shore D or harder. Furthermore, the outfacing surface can have a coefficient of friction of between 0.3 and 0.1 in accordance with ASTM D 1894.

A graphic layer can be disposed between the adhesive film and the dome, or between the substrate and the dome. The graphic layer can include ink disposed on or printed on the substrate. For example, the graphic layer can be an aqueous based inkjet ink. The graphic layer can include indicium 114, such as a logo, a picture, etc. In addition, the graphic layer can include directions for use, orientation, care, etc. Furthermore, the graphic layer can be or can include other inclusions. The graphic layer can be visible through the dome.

The dome can have a thickness between 1-2 mm in one aspect, and 1.2-1.5 mm in another aspect. The thickness of the dome can be dimensionally stable so that the dome is not generally compressible. The dome can have a stiffness with a self-supporting flat layer, yet can be flexible enough to be bent. In addition, the dome can be elastic to return to its self-supporting flat layer. The dome and the outfacing surface can be substantially solid, flat, smooth and continuous.

The 82 can also include inclusions embedded therein. For example, the dome can include a scented material, such as a scented oil, that is permeable through the polyurethane material of the dome. In addition, the dome can be colored and translucent. Furthermore, the dome can include a florescent material.

As discussed above, the dome or the outfacing surface can have a radius perimeter. The dome can be made by pouring the polyurethane material on top of the substrate and graphic layer to form the dome. Thus, the radius perimeter is obtained by individual pouring each dome, without stamping or cutting the dome from a continuous layer. The graphic layer can be printed on the substrate having the adhesive film opposite the graphic layer. The graphic layer can be a discrete graphic contained within the dome, as opposed to a continuous graphic.

In another aspect, the pair of shells 38 and 42 can be oblong and can have at least two magnets 34 aligned with the longitudinal axis 84.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A beverage holder with an insulating sleeve configured to hold a beverage container and a magnetic mount configured to magnetically secure the insulating sleeve with the beverage container therein to a ferromagnetic support structure, the magnetic mount comprising:
an exterior housing located outside the insulating sleeve and on a lateral wall of the insulating sleeve;
at least one magnet carried by the exterior housing and located outside of the insulating sleeve;
an interior backing located on an interior of the insulating sleeve and fastened to the exterior housing through the insulating sleeve;
at least one fastener carried by the exterior housing and the interior backing and extending through at least one aperture in the insulating sleeve; and
the exterior housing and the interior backing sandwiching a portion of the lateral wall of the insulating sleeve therebetween.

2. The beverage holder of claim 1, further comprising:
an array of teeth carried by at least one of the exterior housing and the interior backing, the array of teeth penetrating into the insulating sleeve.

3. The beverage holder of claim 2, wherein the array of teeth circumscribe a perimeter of the at least one of the exterior housing and the interior backing.

4. The beverage holder of claim 2, wherein both of the exterior housing and the interior backing carry arrays of teeth penetrating into the insulating sleeve.

5. The beverage holder of claim 2, further comprising:
a longitudinal axis defined by a lateral wall of the insulating sleeve when in a cylindrical shape;
the array of teeth being carried by at least the interior backing, and
center teeth of the array of teeth nearer a center of the interior backing parallel with the longitudinal axis being taller than other teeth of the array of teeth further from the center.

6. The beverage holder of claim 1, further comprising:
a grip pad carried on the exterior housing and defining an exterior surface configured to contact the support structure; and
the exterior surface of the grip pad being flexible.

7. The beverage holder of claim 6, further comprising:
sleeve indicia carried by an exterior of the insulating sleeve; and
grip pad indicia disposed on the exterior surface of the grip pad.

8. A beverage holder with an insulating sleeve configured to hold a beverage container and a magnetic mount configured to magnetically suspend the insulating sleeve with the beverage container therein to a ferromagnetic support structure, the magnetic mount comprising:
a pair of shells carrying at least one magnet and sandwiching a portion of the insulating sleeve between the pair of shells to mount the at least one magnet to the insulating sleeve; and
a grip pad carried on an exterior shell of the pair of shells and defining an exterior surface configured to contact the support structure; and
the exterior surface of the grip pad being flexible.

9. The beverage holder of claim 8, further comprising:
an indentation in the exterior shell surrounded by a perimeter lip; and
the grip pad disposed in the indentation and having a thickness such that the exterior surface of the grip pad is located beyond the perimeter lip and out of the indentation.

10. The beverage holder of claim 8, further comprising:
sleeve indicia carried by an exterior of the insulating sleeve; and grip pad indicia disposed on the exterior surface of the grip pad.

11. The beverage holder of claim 8, further comprising:
at least one fastener carried by the pair of shells and extending through at least one aperture in the insulating sleeve.

12. A beverage holder, comprising:
an insulating sleeve having a cylindrical lateral wall configured to circumscribe a beverage container; and
a magnetic mount secured to the insulating sleeve and configured to magnetically secure the insulating sleeve with a beverage container therein to a ferromagnetic support structure; the magnetic mount comprising:
a pair of shells comprising an interior shell located inside the insulating sleeve and an exterior shell located outside the insulting sleeve, the pair of shells joined together through the lateral wall of the insulating sleeve;
at least one fastener carried by the pair of shells and extending through at least one aperture in the insulating sleeve to couple the pair of shells together;
each of the pair of shells having an array of teeth penetrating into the insulating sleeve;
at least one magnet carried by the exterior shell and located between the exterior shell and the lateral wall of the insulating sleeve;
a grip pad carried on the exterior side of the exterior shell and defining an exterior surface configured to contact the support structure; and
the exterior surface being flexible.

13. The beverage holder of claim 12, further comprising:
the array of teeth of the interior shell and the array of teeth of the exterior shell being off-set with respect to one another and teeth of the arrays being intermeshed with a tooth of the interior shell extending between a pair of adjacent teeth of the exterior shell.

14. The beverage holder of claim 12, further comprising:
a gap between the pair of shells being smaller than a thickness of the lateral wall of the insulating sleeve.

15. The beverage holder of claim 12, further comprising:
sleeve indicia carried by an exterior of the insulating sleeve; and
grip pad indicia disposed on the exterior surface of the grip pad.

16. The beverage holder of claim 12, further comprising:
an array of holes extending through the lateral wall of the insulating sleeve; and
the at least one fastener comprising an array of fasteners extending through the array of holes, respectively.

17. The beverage holder of claim 12, wherein the at least one fastener comprises:
a portion carried by the interior shell engaging another portion carried by the exterior shell;
one of the portions comprising a finger with a hook; and
another of the portions comprising a cavity with a tab engaged by the hook of the finger.

18. The beverage holder of claim 12, further comprising:
the pair of shells being oblong and having a longitudinal axis parallel with a longitudinal axis of the insulating sleeve; and
the at least one magnet comprising at least two magnets aligned with the longitudinal axes.

19. The beverage holder of claim 12, further comprising:
the exterior shell having an interior side;
the interior side of the exterior shell having a concave shape; and
the concave shape being elongated along a longitudinal axis parallel with a longitudinal axis of the insulating sleeve.

20. The beverage holder of claim 12, further in combination with the beverage container received within the insulating sleeve and the magnetic mount magnetically coupled to the support structure with the beverage container and insulating sleeve pendent therefrom.

* * * * *